United States Patent
Carroll

(10) Patent No.: US 11,100,122 B2
(45) Date of Patent: Aug. 24, 2021

(54) HIERARCHICAL DATA SEARCHING USING TENSOR SEARCHING, FUZZY SEARCHING, AND BAYESIAN NETWORKS

(71) Applicant: Aetna Inc., Hartford, CT (US)

(72) Inventor: Daniel Carroll, Tucson, AZ (US)

(73) Assignee: Aetna Inc., Hartford, CT (US)

( * ) Notice: Subject to any disclaimer, the term of this patent is extended or adjusted under 35 U.S.C. 154(b) by 163 days.

(21) Appl. No.: 16/589,878

(22) Filed: Oct. 1, 2019

(65) Prior Publication Data

US 2021/0097071 A1 Apr. 1, 2021

(51) Int. Cl.
*G06F 16/2457* (2019.01)
*G06F 16/2458* (2019.01)
*G06F 16/901* (2019.01)
*G06N 7/00* (2006.01)

(52) U.S. Cl.
CPC .... *G06F 16/2468* (2019.01); *G06F 16/24578* (2019.01); *G06F 16/9024* (2019.01); *G06N 7/005* (2013.01)

(58) Field of Classification Search
CPC .......... G06F 16/2468; G06F 16/24578; G06F 16/9024; G06N 7/005
See application file for complete search history.

(56) References Cited

U.S. PATENT DOCUMENTS

2020/0233864 A1* 7/2020 Jin .................. G06F 16/215

OTHER PUBLICATIONS

Allen et al., TuckER: Tensor Factorization for Knowledge Graph Completion, Aug. 24, 2019, pp. 1-11 (Year: 2019).*
Ma et al., Deep Neural Architecture Search with Deep Graph Bayesian Optimization, Oct. 14-17, 2019, ACM, pp. 500-507 (Year: 2019).*
He et al., Knowledge Base Completion by Variational Bayesian Neural Tensor Decomposition, Jun. 26, 2018, Springer Science+ Business Media, LLC, pp. 1075-1084 (Year: 2018).*

* cited by examiner

*Primary Examiner* — Jorge A Casanova
(74) *Attorney, Agent, or Firm* — Leydig, Voit & Mayer, Ltd.

(57) ABSTRACT

Methods and systems for performing a search over hierarchical data are provided. The method may be performed by a server comprising a processor and memory. The method includes receiving a query string from a user device. The query string is searched for via a tensor search of a graph structure to determine node tensor distance score for each node in the graph structure. The query string is searched for via a fuzzy search of the graph structure to determine node fuzzy distance score for each node in the graph structure. Nodes with relevant scores are determined by updating a Bayesian network representation with evidence based on the node tensor distance scores and the node fuzzy distance scores of each node. Relevant data from the nodes is sent with relevant scores to the user device.

16 Claims, 8 Drawing Sheets

LEGEND:
A = Low blood sugar
B = High blood sugar
C = Pregnancy
---
D = Type 1 Diabetes
E = Type 2 Diabetes
F = Gestational Diabetes
---
H = Primary Care Physician
I = Endocrinologist
J = OB/GYN

| 1,<br>(0,0) | | 2,<br>(0,1) | | 3,<br>(0,2) | | 4,<br>(0,3) | | 5,<br>(0,4) | | 6,<br>(0,5) | | 7,<br>(0,6) | | 8,<br>(0,7) | | 9,<br>(0,8) | | 0,<br>(0,9) |
|---|---|---|---|---|---|---|---|---|---|---|---|---|---|---|---|---|---|---|
| | Q,<br>(1,0) | | W,<br>(1,1) | | E,<br>(1,2) | | R,<br>(1,3) | | T,<br>(1,4) | | Y,<br>(1,5) | | U,<br>(1,6) | | I,<br>(1,7) | | O,<br>(1,8) | |
| | | A,<br>(2,0) | | S,<br>(2,1) | | D,<br>(2,2) | | F,<br>(2,3) | | G,<br>(2,4) | | H,<br>(2,5) | | J,<br>(2,6) | | K,<br>(2,7) | | |
| | | | Z,<br>(3,0) | | X,<br>(3,1) | | C,<br>(3,2) | | V,<br>(3,3) | | B,<br>(3,4) | | N,<br>(3,5) | | M,<br>(3,6) | | ::<br>(3,7) | | |

FIG. 6

Symptoms

| P(A) | |
|---|---|
| A=0 | A=1 |
| .8 | .2 |

| P(B) | |
|---|---|
| B=0 | B=1 |
| .95 | .05 |

| P(C) | |
|---|---|
| C=0 | C=1 |
| .05 | .95 |

FIG. 8

HIERARCHICAL DATA SEARCHING USING TENSOR SEARCHING, FUZZY SEARCHING, AND BAYESIAN NETWORKS

BACKGROUND

Search engines are information retrieval systems for finding information on a computer system. Search engines help reduce time for finding relevant information and also allow users to consult or engage search results rather than engage an entire corpus being searched over. Search engines include web search engines for finding information on the World Wide Web, application search engines for finding information within an application, and so on. Search engines receive a search query term or query text string from a user and provide a response with relevant results to the user.

Conventionally, text-based search is achieved by comparing the query with the terms in the set of documents being searched over. The method of comparison usually employs some manner of fuzzy distance between terms and an inverse frequency method for determining importance of term matches. Further these methods usually depend on extensive synonym dictionaries which must be hand curated. While these methods may be are attractive due to their simplicity and computational scalability they prove labor intensive to hand engineer.

SUMMARY

In one embodiment, a method for performing a search over hierarchical data is provided. The method may be performed by a server comprising a processor and memory. The method includes receiving a query string from a user device. The query string is searched for via a tensor search of a graph structure to determine node tensor distance score for each node in the graph structure. The query string is searched for via a fuzzy search of the graph structure to determine node fuzzy distance score for each node in the graph structure. Nodes with relevant scores are determined by updating a Bayesian network representation with evidence based on the node tensor distance scores and the node fuzzy distance scores of each node. Relevant data from the nodes is sent with relevant scores to the user device.

In another embodiment, a server for performing a search over hierarchical data is described. The server includes a processor and a non-transitory computer readable medium storing instructions thereon such that when the instructions are executed by the processor, the server performs a number of steps. The steps include receiving a query string from a user device. The query string is searched for via a tensor search of a graph structure to determine node tensor distance score for each node in the graph structure. The query string is searched for via a fuzzy search of the graph structure to determine node fuzzy distance score for each node in the graph structure. Nodes with relevant scores are determined by updating a Bayesian network representation with evidence based on the node tensor distance scores and the node fuzzy distance scores of each node. Relevant data from the nodes is sent with relevant scores to the user device.

In yet another embodiment, a non-transitory computer readable medium storing instructions thereon is provided. When the instructions are executed by a processor, the processor performs a number of steps. The steps include receiving a query string from a user device. The query string is searched for via a tensor search of a graph structure to determine node tensor distance score for each node in the graph structure. The query string is searched for via a fuzzy search of the graph structure to determine node fuzzy distance score for each node in the graph structure. Nodes with relevant scores are determined by updating a Bayesian network representation with evidence based on the node tensor distance scores and the node fuzzy distance scores of each node. Relevant data from the nodes is sent with relevant scores to the user device.

BRIEF DESCRIPTION OF THE DRAWINGS

FIG. 6 illustrates a grid representation scheme for determining a modified Levenshtein distance according to an embodiment of the disclosure;

FIG. 8 is a probability table for symptoms according to an embodiment of the disclosure.

DETAILED DESCRIPTION

Figure 1:
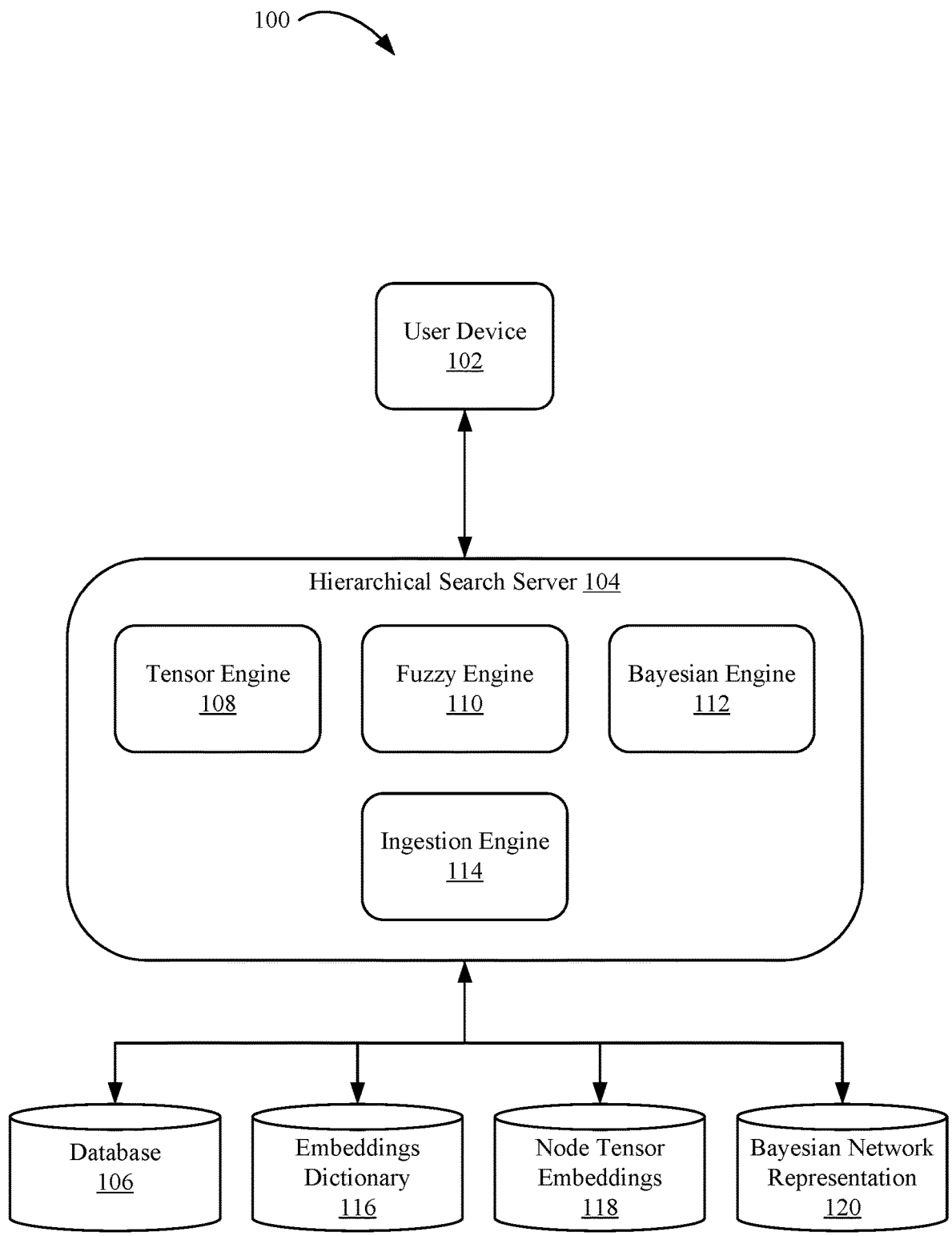
FIG. 1 illustrates a system for hierarchical searching according to an embodiment of the disclosure.

Most search problems, e.g., Internet search and application search, involve receiving query terms and getting results relevant to the query terms. Search can be considered in many ways but two are prevalent. The first and most common approach is a purely frequentist approach, whereby documents are deemed relevant to a query based on how frequently they are selected by users with a given query. This approach requires a significant amount of user interaction to produce relevant results.

In a second approach, search is performed using a hand-engineered approach. This includes searching over text strings and using a tokenization framework. A problem that arises with this approach is that only literal comparisons are returned by the search engine. For example, "dog" and "golden retriever" are two very different search terms but semantically, they are related and somewhat similar. To account for the hand-engineered approach being limited to literal comparisons, engineers use huge synonym lists that are hand engineered to be able to link different search terms, e.g., "dog" and "golden retriever". To enumerate all the possible synonyms for even a small search problem appears is a difficult or even impossible task.

Embodiments of the disclosure provide a search engine that performs search over a hierarchical text dataset. In conventional text search the goal is to perform search over a set of flat files and return relevant files via some scoring function. In hierarchical search, rather than perform search over flat files, embodiments of the disclosure search over files organized in a graph structure and return relevant files via a scoring function. In some embodiments, three components are included, which lead to better performance through better relevance than traditional techniques. These three components perform relevance scoring via vector embedding, relevance scoring via fuzzy distance, and probabilistic scoring via a Bayesian propagation algorithm.

Vector embedding involves representing natural language via vectors. Construction of term embeddings from natural language terms is performed by applying machine learning on a large corpus. After machine learning, a mapping between a term embedding (or vector) and a term is acquired. A collection of such mappings for converting terms to vectors is a term-vector dictionary. Once the term-vector dictionary has been constructed, similarity between any two terms in the term-vector dictionary may be measured using, e.g., a standard cosine distance between vectors. Term-vector dictionary and embeddings dictionary are used synonymously in this document.

Vector embedding allows searching over the structure learned from the corpus. For example, a standard regular expression (regex) or fuzzy string comparison between "endocrine" and "diabetes" shows no meaningful similarity between the two terms, however since the terms have similar underlying meaning and are used in similar contexts, the learned vector embedding places the two terms nearby one another in the vector space. This nearby placement in the vector space allows searching in the vector space to detect their similarity using the cosine distance metric. As such, in embodiments of the disclosure, vector embedding allows searching over meaning rather than spelling.

In addition to vector embedding, embodiments of the disclosure determine fuzzy distance which allows for comparison of text strings by providing a measure of the distance to convert one string being compared to the other string being compared. Embodiments of the disclosure use the fuzzy distance metric to accurately determine relevance for searches with misspellings of data contained in nodes of the hierarchical structure. For example, the use of a fuzzy distance metric allows the inference that "diabeted" and "diabetes" are likely relevant to one another since the two strings are close to one another using the fuzzy distance metric.

Furthermore, after vector embedding and fuzzy distance comparisons, embodiments of the disclosure determine most relevant results using a Bayesian propagation algorithm. Most relevant results are determined by ingesting and representing the hierarchal text dataset as a Bayesian network, and relevance of each node in the Bayesian network is then determined by belief propagation of the evidence, determined by the fuzzy distance and vector embedding searches earlier performed, at each node through the network. The nodes can then be filtered by total relevance score and layer of the network/hierarchy as desired.

Embodiments of the disclosure provide several advantages over conventional searching methods. Firstly, a large user base is not required to obtain good search results, thus reducing the amount memory used during searches. With a lower memory requirement, search results can be obtained faster, thus increasing processing speed of a server or cloud service providing the search service. Secondly, hand-engineered synonym lists are not required thus the embodiments can be scaled to search problems of different sizes at much lower costs.

FIG. 1 illustrates a system 100 for hierarchical searching according to an embodiment of the disclosure. The system 100 includes a user device 102, a hierarchical search server 104, a database 106 and/or other databases and storage, e.g., embeddings dictionary 116, node tensor embeddings 118, and Bayesian network representation 120. The user device 102 sends a query term, string, or text to the hierarchical search server 104, and the hierarchical search server 104 provides the user device 102 with relevant search results. The hierarchical search server 104 uses the various databases and storage options to determine the relevant search results according to embodiments of the disclosure.

The user device 102, the hierarchical search server 104 and the various databases, e.g., database 106, embeddings dictionary 116, node tensor embeddings 118, and Bayesian network representation 120 are computing devices with a processor and a non-transitory computer readable medium. The user device 102 can be a desktop computer, a laptop computer, a smartphone, a smartwatch, a smart television, and so on.

The hierarchical search server 104 and the various databases can be realized by a cloud service, a server, and so on. The hierarchical search server 104 implements several software engines that cooperate to generate the relevant search results provided to the user device 102. A software engine is a combination of hardware and software for performing one or more specific functions. The hierarchical search server 104 includes an ingestion engine 114 for taking a hierarchical dataset and creating a graph structure, a tensor engine 108 for performing tensor searches on the graph structure, a fuzzy engine 110 for performing fuzzy searches between a query term and nodes within the graph structure, and a Bayesian engine 112 for performing belief propagation and updating probabilities to determine the relevant search results.

Figure 2:
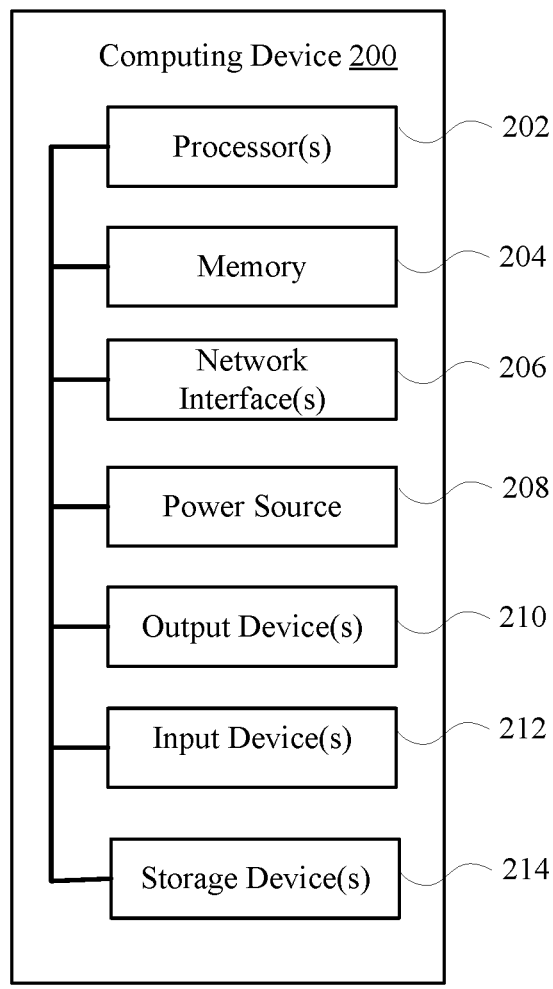
FIG. 2 illustrates a computing device according to an embodiment of the disclosure.

FIG. 2 is a block diagram illustrating basic hardware components of a computing device 200, according to some example embodiments. The computing device 200 is an architecture for one or more servers for implementing the hierarchical search server 104 and the different databases. The computing device 200 also is an architecture for the user device 102. The computing device 200 may include one or more processors 202, memory 204, network interfaces 206, power source 208, output devices 210, input devices 212, and storage devices 214. To simplify the discussion, the singular form will be used for all components identified in FIG. 2, when appropriate, but the use of the singular does not limit the discussion to only one of each component. For example, multiple processors may implement functionality attributed to processor 202.

Processor 202 is configured to implement functions and/or process instructions for execution within the computing device 200. For example, processor 202 executes instructions stored in memory 204 or instructions stored on a storage device 214. In certain embodiments, instructions stored on storage device 214 are transferred to memory 204 for execution at processor 202. Memory 204, which may be a non-transient, computer-readable storage medium, is configured to store information within the device 200 during operation. In some embodiments, memory 204 includes volatile memories such as RAM, dynamic random access memories (DRAM), and static random access memories (SRAM). Memory 204 also maintains program instructions for execution by the processor 202 and serves as a conduit for other storage devices (internal or external) coupled to the computing device 200 to gain access to processor 202.

Storage device 214 includes one or more non-transient computer-readable storage media configured for long-term storage of information. In some embodiments, the storage device 214 includes floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The computing device 200 may include multiple network interfaces 206 to facilitate communication via multiple types of networks. Network interfaces 206 may include network interface cards, such as Ethernet cards, optical transceivers, radio frequency transceivers, or any other type of device that can send and receive information. Examples of network interfaces 206 include radios compatible with several Wi-Fi standards, 3G, 4G, Long-Term Evolution (LTE), Bluetooth®, etc.

Power source 208 provides power to the computing device 200. Examples include rechargeable or non-rechargeable batteries utilizing nickel-cadmium or other suitable material. Power source 208 may include a regulator for regulating power from the power grid in the case of a device plugged into a wall outlet.

The computing device 200 may also be equipped with one or more output devices 210. Output device 210 is configured to provide output to a user using tactile, audio, and/or video information. Examples of output device 210 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the computing device 200.

The computing device 200 may also be equipped with one or more input devices 212. Input devices 212 are configured to receive input from a user or the environment where the computing device 200 resides. In certain instances, input devices 212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

Figure 3:
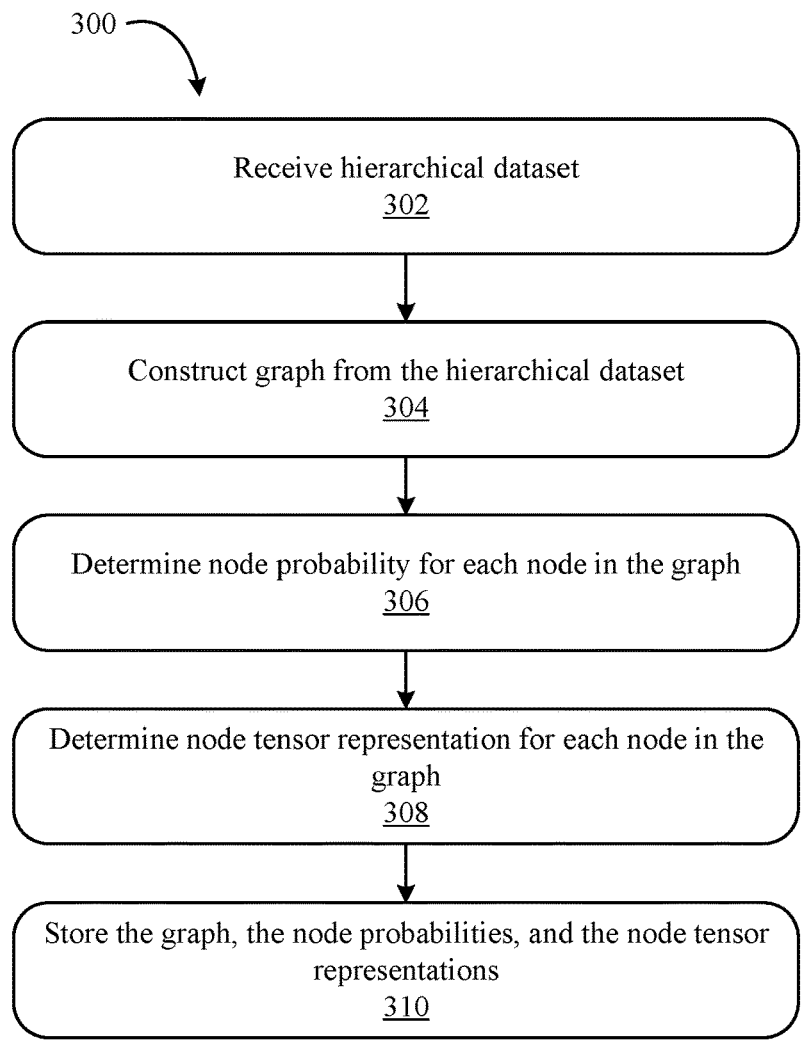
FIG. 3 is a flow diagram illustrating steps for ingesting a hierarchical dataset according to an embodiment of the disclosure.

FIG. 3 is a flow diagram illustrating a process 300 performed by a hierarchical search server, e.g., the hierarchical search server 104, for ingesting a hierarchical dataset, according to an embodiment of the disclosure. The process 300 can be performed by the ingestion engine 114 of the hierarchical search server 104 with assistance from the tensor engine 108. At step 302, the ingestion engine 114 of the hierarchical search server 104 receives the hierarchical dataset. The hierarchical dataset may be retrieved from database 106. The hierarchical dataset includes information on ontology and how different items within the hierarchical dataset are related. In an example, a hierarchical dataset includes a three-level dataset for medical diagnoses and related medical specialties where the hierarchical dataset includes symptoms, conditions, and medical provider specialties. The use of ontology to classify items within the hierarchical dataset separates this type of dataset from flat files. The hierarchical dataset may be in a JavaScript Object Notation (JSON) format.

At step 304, the ingestion engine 114 of the hierarchical search server 104 constructs a graph structure from the hierarchical dataset. The graph structure is preferably a directed acyclic graph with entries at each level or hierarchy layer interpreted as nodes with edges drawn between connected data in the hierarchy.

Figure 4:
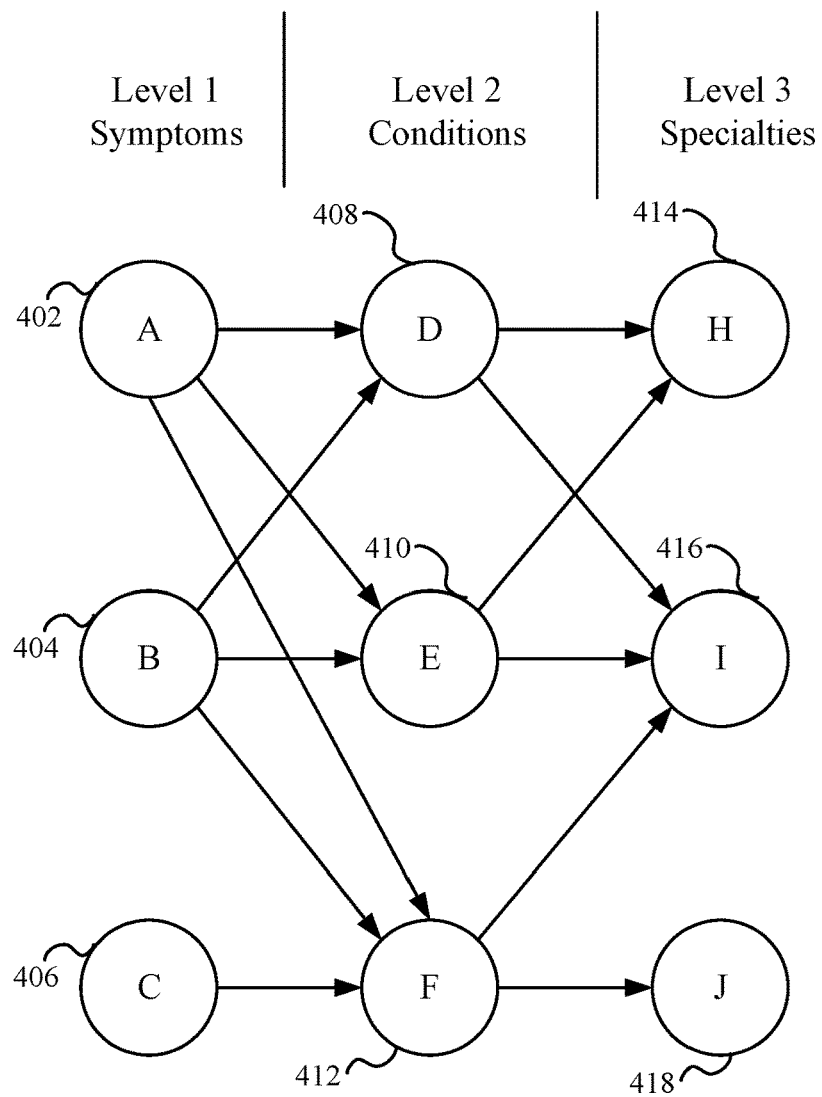
FIG. 4 is an example of a generated graph structure according to an embodiment of the disclosure.

FIG. 4 is an example of a generated graph structure according to an embodiment of the disclosure. The example in FIG. 4 describes a relationship between symptoms, conditions, and medical specialties. Symptoms are at the lowest level of the graph and denoted as Level 1, conditions are at mid-level and denoted as Level 2, and specialties are at the top level and denoted as Level 3. Nodes in Level 1 are node 402, 404, and 406 which stand for low blood sugar, high blood sugar, and pregnancy, respectively. Nodes in Level 2 are nodes 408, 410, and 412 which stand for type 1 diabetes, type 2 diabetes, and gestational diabetes. Nodes in Level 3 are nodes 414, 416, and 418 which stand for primary care physician, endocrinologist, and obstetrician and gynecologist (OB/GYN). Directed edges from symptoms in Level 1 to conditions in Level 2 indicate that a certain symptom is indicative of one or more conditions. For example, low blood sugar is a symptom that can be indicative of type 1 diabetes, type 2 diabetes, and gestational diabetes, thus node 402 has edge lines drawn to each of nodes 408, 410, and 412. The Level 1 nodes are entry nodes while the Level 2 and 3 nodes are non-entry nodes. Note that with the directional nature of the graph as depicted in FIG. 4, the entry nodes of Level 1 are parent nodes, and the non-entry nodes at Level 3 are leaf nodes.

At step 306, the ingestion engine 114 of the hierarchical search server 104 determines node probability for each node in the graph structure. In an embodiment, for entry nodes discrete probability distributions are read in as metadata from the hierarchical dataset. That is, for a given piece of data with n states, prior probabilities are provided for finding the piece of data in each state. For example, FIG. 8 provides a quick example of probabilities for symptoms for the entry nodes in the graph structure of FIG. 4. Each entry node can be in one of two states, so a probability of being in each state is provided. In an embodiment, if prior probabilities are not provided for the piece of data, then a uniform distribution is assumed. For example, the states may be discrete. Therefore, assuming a uniform discrete distribution, if there are n possible states then each state has a 1/n probability of occurring.

In an embodiment, for non-entry nodes, conditional probability tables can be read as metadata from the hierarchical dataset. That is, for a given piece of data with n states that also depends on some other related pieces of data, conditional probabilities are provided based on the configuration of the state of the concerned data and its relations. In an embodiment, if probabilities are not provided for the data, then a conditional probability table is constructed assuming a positive and equally distributed relationship between the concerned data and its relationships. All the edges originating from a node have equal weight if conditional probabilities are not provided.

At step 308, the tensor engine 108 of the hierarchical search server 104 determines node tensor representation for each node in the graph structure. The process of determining node tensor representation involves grouping compound words, removing commonly used terms with no meaningful context, removing terms not present in the embeddings dictionary, and converting the remaining terms to a vector representation using the embedding dictionary.

When grouping compound words, for each node, the text data is read. There are many potential ways to group terms from given text data into meaningful atomic phrases, so the tensor engine 108 performs a search over the permutation space of potential phrases. In an example, consider the phrase "Machine learning is powerful." Naively this phrase can be embedded as ["Machine", "learning", "is", "powerful"], but this would fail to interpret the meaning of "machine learning," since "machine learning" as a phrase means something entirely different than the notions ascribed to "machine" or "learning" separately.

In an embodiment, the tensor engine 108 takes in a parameter maximum number of words. The parameter maximum number of words can be, e.g., 2. The tensor engine 108 loops through the terms in the text data looking for two term phrases found in an embeddings dictionary, e.g., embeddings dictionary 116. If the two term phrase is found in the embeddings dictionary as an atomic term, then each of its component term is removed from the list, and the process is repeated. That is, when performing the process on "Machine learning is powerful," the groupings will end up looking like ["Machine learning", "is", "powerful"].

After grouping compound words, the resulting list of words may include commonly used terms that provide no meaningful context. These commonly used terms are then removed from the list of words. For the "Machine learning is powerful" example, "is" is a commonly used word that provides no meaning and is thus removed. The removal process can be performed by looping through the terms in the list and checking each entry against a set of stop words. After removing these commonly used terms, the phrase list representation looks like ["Machine learning", "powerful"].

The tensor engine 108 then takes the phrase list representation for each node and fetches a representative vector from the embeddings dictionary 116. The list of vectors returned for each node is the tensor representation.

At step 310, the hierarchical search server 104 stores the graph structure constructed at step 304, the node probabilities determined at step 306, and the node tensor representations determined at step 308. These different data can be stored in the database 106 or in the combination of the database 106, the embeddings dictionary 116, the node tensor embeddings 118, and the Bayesian network representation 120. The Bayesian network representation 120 may store probabilities, conditional probabilities, or parameters used to determine probability distribution functions for determining probabilities at different nodes.

Figure 5:
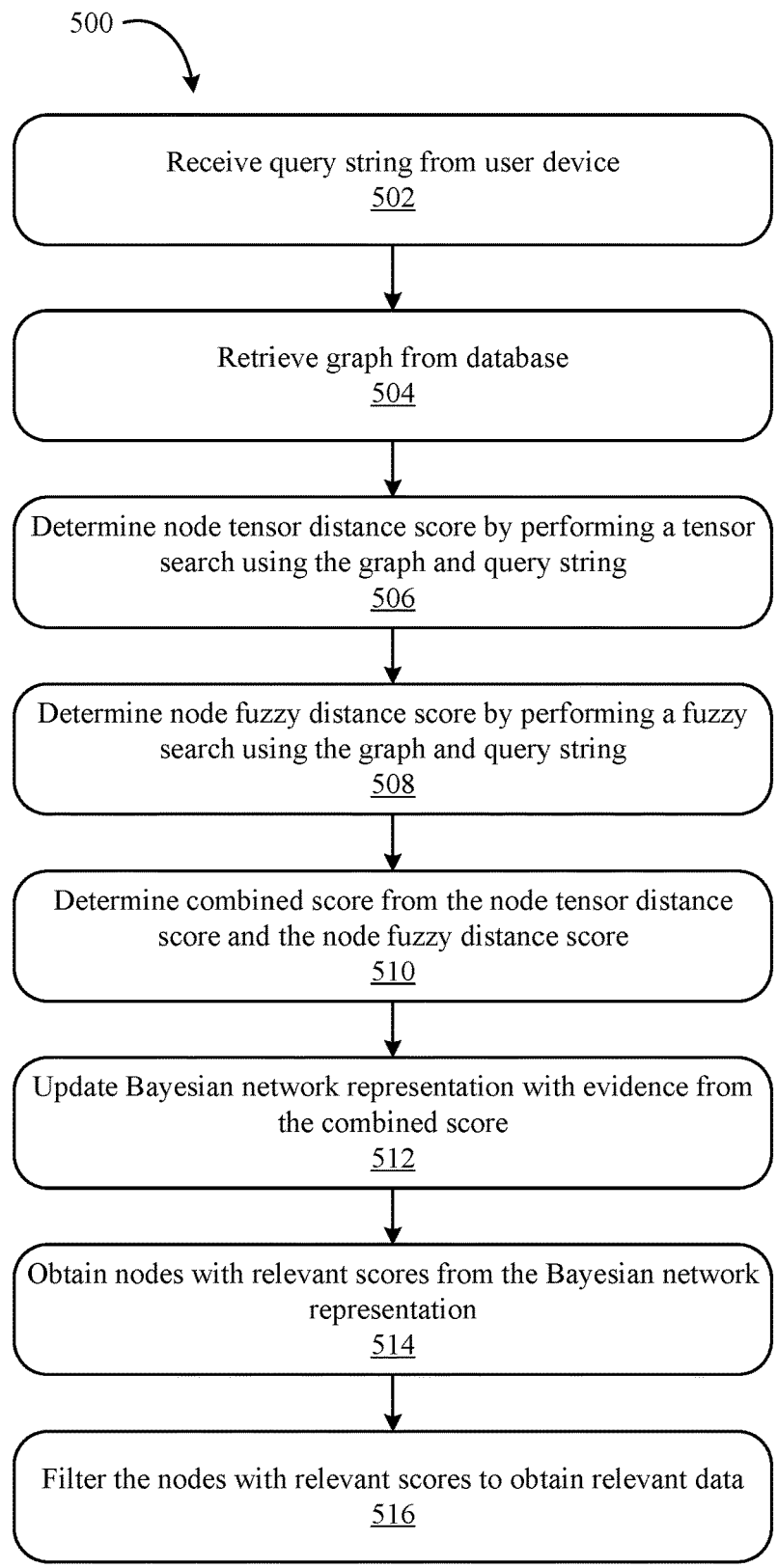
FIG. 5 is a flow diagram illustrating steps for performing a search according to an embodiment of the disclosure.

FIG. 5 is a flow diagram illustrating a process 500 for performing a search according to an embodiment of the disclosure. At step 502, the hierarchical search server 104 receives a query string from the user device 102. At step 504, the hierarchical search server 104 retrieves a graph structure from the database 106.

Figure 7:
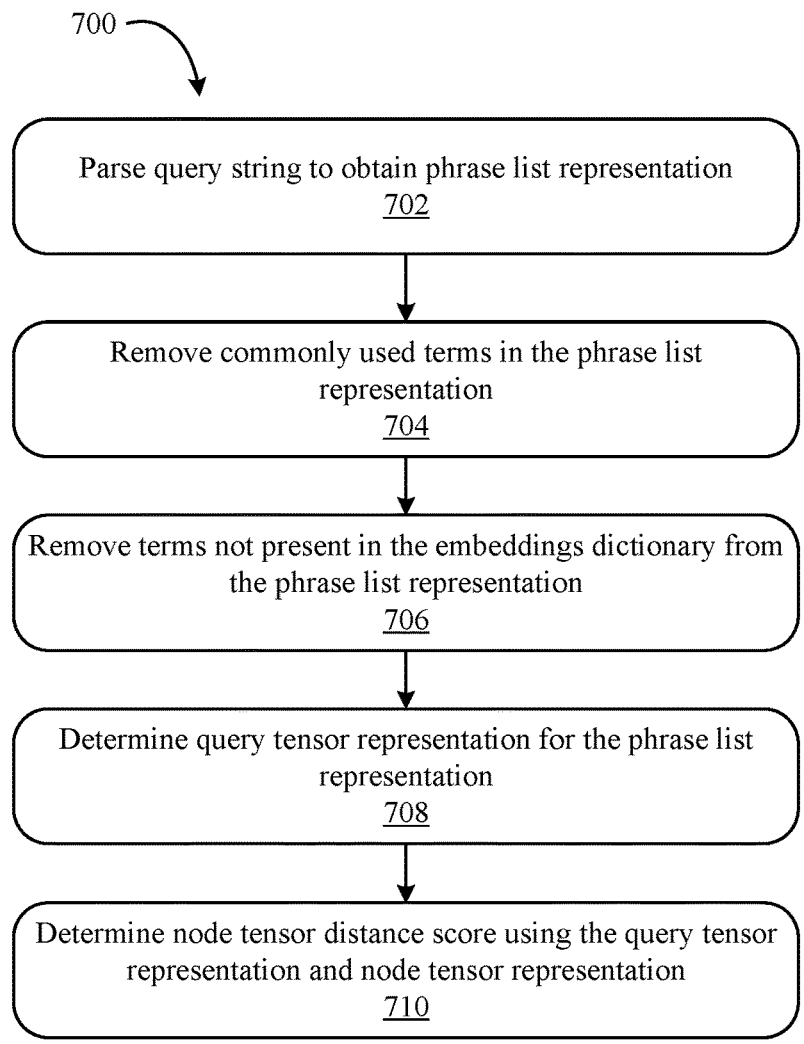
FIG. 7 is a flow diagram illustrating steps for determining node tensor distance scores according to an embodiment of the disclosure.

At step 506, the tensor engine 108 of the hierarchical search server 104 determines node tensor distance score by performing a tensor search using the graph and the query string. In an embodiment, FIG. 7 provides a process 700 for determining node tensor distance scores according to an embodiment of the disclosure. The process in FIG. 7 will be described later but involves first converting the query string to a vector (or tensor) representation and comparing the tensor representation of the query string to the tensor representation of each node in the graph structure retrieved at step 504. Nodes with similarity above a threshold are kept track of, and a similarly magnitude for each node is determined as the node tensor distance score for the query string.

At step 508, the fuzzy engine 110 of the hierarchical search server 104 determines node fuzzy distance score by performing a fuzzy search using the graph retrieved at step 504 and the query string received at step 502. For each node, the query string and the node string are compared by the fuzzy engine 110 to determine a distance between the strings. In an embodiment, a Levenshtein distance between the query string and each node text is determined. In Levenshtein distance, a character change between characters always incurs a penalty of 1. In another embodiment, a modified Levenshtein distance based on a keyboard layout, e.g., as provided in FIG. 6, is used to determine distance between the strings.

FIG. 6 illustrates a grid representation scheme for determining a modified Levenshtein distance according to an embodiment of the disclosure. The fuzzy engine 110 of the hierarchical search server 104 determines the node fuzzy distance score as a penalty of the magnitude of the Euclidean distance between the keys using the grid representation scheme. Although displayed in a serial manner, steps 506 and 508 are independent of each other and can be performed concurrently. In some embodiments, only one of step 506 or 508 is performed.

At step 510, the hierarchical search server 104 determines, for each node, a combined score from the node tensor distance score of step 506 and the node fuzzy distance score of step 508. In an embodiment, the combined scores are distributed in the inclusive interval from 0 to 1, where 0 indicates no knowledge of the node being relevant and 1 indicating total certainty of the node being relevant. If, for a particular node, the node fuzzy distance score is above some similarity threshold, then the resulting combined score for that node is 1. Otherwise, the combined score is determined by scaling and combining the node fuzzy distance score and the node tensor distance score. The process of scaling and combining is a weighted average process. In an example, Eq. 1 is used to determine combined score for each node. Values of $c_0$ and $c_1$ are determined through parameter fitting on an experimental dataset.

$$\frac{c_0(\text{node tensor distance score}) + c_1(\text{node fuzzy distance score})}{2} \quad \text{Eq. 1}$$

At step 512, for each node, the Bayesian engine 112 of the hierarchical search server 104 updates the Bayesian network representation with evidence from the combined score. The graph structure retrieved from step 502 includes probabilities associated with each node, so the Bayesian engine 112 first performs belief propagation on the Bayesian network representation without evidence applied. The Bayesian engine 112 then determines which nodes in the network for which the combined scores provide more information. That is, the nodes that have greater evidence of relevance than was determined by the belief propagation without evidence.

At step 514, the Bayesian engine 112 then obtains nodes with relevant scores from the Bayesian network representation. The Bayesian engine 112 applies belief propagation algorithm to the Bayesian network representation with evidence applied for the nodes that have greater evidence of relevance as determined in step 512. After belief propagation is completed, the Bayesian engine 112 obtains a list of nodes and relevance probability scores for each node in the list.

At step 516, the hierarchical search server 104 filters the nodes with relevant scores to obtain relevant data. In an embodiment, relevant data is data from nodes with relevant scores at a certain level of the hierarchy. Using the example in FIG. 4, the user device 102 may be searching for symptoms, so if the list of nodes with relevant scores included nodes 402, 410, and 416, then the hierarchical search server 104 returns node 402 and text associated with node 402, i.e., "low blood sugar" as the relevant data. If the user device 102 is searching for conditions, then text from node 410 can be returned.

In an embodiment, the relevant data is not curated based on level in the graph hierarchy. So following the previous example where the list of nodes with relevant scores included nodes 402, 410, and 416, the hierarchical search server 104 does not curate the search results but provides text data from each of these nodes. That is, the hierarchical search server 104 provides "low blood sugar", "type 2 diabetes", and "endocrinologist" to the user device 102.

In describing the process 500, FIG. 7 provides a process 700 for determining node tensor distance scores according to an embodiment of the disclosure. The process 700 is an example of how step 506 can be performed. At step 702, the hierarchical search server 104 parses the query string to obtain a phrase list representation. For example, "Machine learning is powerful" is parsed to ["Machine learning", "is", "powerful"].

At step 704, the hierarchical search server 104 removes commonly used terms in the phrase list representation. So in the previous example, "is" is removed and the phrase list representation becomes ["Machine learning", "powerful"].

At step 706, the hierarchical search server 104 removes terms not present in the embeddings dictionary 116 from the phrase list representation.

At step 708, the hierarchical search server 104 determines query tensor representation for the phrase list representation using the embeddings dictionary 116.

At step 710, the hierarchical search server 104 determines node tensor distance score using the query tensor representation and node tensor representation. Recall that the node tensor representation is stored in the node tensor embeddings 118 and/or the database 106 and was determined at, e.g., step 308 during the ingestion process. For each node, the hierarchical search server 104 performs pairwise distance calculation of elements in the node tensor representation with elements in the query tensor representation. That is, for each query vector $q_i$ in the query tensor representation, a cosine similarity is computed between the vector $q_i$ and each of the vectors $n_0, n_1, \ldots, n_k$ in the node tensor representation. The highest score of these cosine similarities is entered as entry $v_i$ component of a similarity vector. The hierarchical search server 104 then takes the similarity vector and squashes values that are below some threshold. For example, values in the similarity vector below some value k say 0.6 are set to 0. The hierarchical search server 104 then determines the norm of the similarity vector after squashing to be the node tensor distance score.

Embodiments of the disclosure provide a system and method for searching over a hierarchical text dataset. An advantage of some embodiments include searching over hierarchies while remaining conscious of underlying hierarchical structure. In the example provided above, a search for "Pregnancy" symptom allows one to obtain a specialty or a condition. Another advantage is some embodiments allow search to be conscious of data besides that which is directly provided by a user device.

Embodiments of the disclosure provides improved relevance in search over existing techniques. Users will be more likely to find information and services being searched for thus enhancing user experience when using an application that employs a search engine according to embodiments of the disclosure.

Embodiments of the disclosure provide a search engine that employs tensor search, fuzzy search, and Bayesian propagation. The tensor search capability allows comparing user queries with given text by comparing the similarity of the learned meaning between the structures. This allows understanding that a user searching for "high blood sugar" may be interested in results related to "hyperglycemia" even though the spelling of these terms would fail to be identified by fuzzy string comparisons. In some embodiments, rather than using the standard string distance metric Levenshtein distance, a distance metric which measures distance via a distance function based on a layout of a smartphone is used. Fuzzy search using this distance metric allows efficiently searching over text space to detect misspellings likely to have been introduced using a keyboard, smartphone, or comparable device.

Search across hierarchies is sometimes modeled as a stateless process, but modeling the search with state using a Bayesian approach provides some advantages. Bayesian propagation allows taking advantage of prior searches made within the same session, or across the lifetime of the search profile, to provide context to a new search. Strength of paths between searches in the network can be estimated using parameter learning techniques, allowing the learning of which paths in the hierarchy should have the most input.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing a search over hierarchical data, the method performed by a server comprising a processor and memory, the method comprising:

receiving a query string from a user device;

searching for the query string via a tensor search of a graph structure to determine node tensor distance score for each node in the graph structure;

searching for the query string via a fuzzy search of the graph structure to determine node fuzzy distance score for each node in the graph structure;

determining nodes with relevant scores by updating a Bayesian network representation with evidence based on the node tensor distance scores and the node fuzzy distance scores of each node; and sending relevant data from the nodes with relevant scores to the user device, wherein the relevant score is based on the node fuzzy distance score being above or equal to a similarity threshold and the relevant score being a weighted average of the node tensor distance score and the node fuzzy distance score based on the node fuzzy distance score being below the similarity threshold.

2. The method according to claim 1, wherein the fuzzy search comprises determining a fuzzy distance metric of a Levenshtein distance where a character change between characters incur a penalty or a magnitude of a Euclidean distance between keys in a grid representation.

3. The method according to claim 1, wherein the tensor search comprises determining a sequence tensor for the node.

4. The method according to claim 1, further comprising:
ingesting the hierarchical data to generate the graph structure; and
determining node tensor representation for each node in the graph structure, wherein the node tensor representation for each node is compared to a query string tensor representation during the tensor search.

5. The method according to claim 4, wherein comparing the query string tensor representation to the node tensor representation for each node comprises determining cosine similarities between elements in the query string tensor representation and elements in the node tensor representation for each node.

6. The method according to claim 4, wherein determining node tensor representation for each node in the graph structure comprises:
obtaining node data for a respective node, the node data comprising a phrase;
grouping compound words in the phrase to obtain one or more term groupings;
removing commonly used terms within the one or more term groupings;
removing terms not present in the embeddings dictionary from the one or more term groupings; and
determining the node tensor representation for the respective node as vector representations of the one or more term groupings.

7. The method according to claim 6, wherein a parameter maximum number of words determines how many words are combined when grouping compound words in the phrase.

8. The method according to claim 4, wherein the hierarchical data is in a JavaScript Object Notation (JSON) format.

9. The method according to claim 1, wherein relevant data from the nodes with relevant scores is data from a specific hierarchical level.

10. A server for performing a search over hierarchical data, the server comprising a processor and a non-transitory computer readable medium storing instructions thereon such that when the instructions are executed by the processor, the server performs the steps comprising:
receiving a query string from a user device;
searching for the query string via a tensor search of a graph structure to determine node tensor distance score for each node in the graph structure;
searching for the query string via a fuzzy search of the graph structure to determine node fuzzy distance score for each node in the graph structure;
determining nodes with relevant scores by updating a Bayesian network representation with evidence based on the node tensor distance scores and the node fuzzy distance scores of each node; and
sending relevant data from the nodes with relevant scores to the user device, wherein the relevant score is based on the node fuzzy distance score being above or equal to a similarity threshold and the relevant score being a weighted average of the node tensor distance score and the node fuzzy distance score based on the node fuzzy distance score being below the similarity threshold.

11. The server according to claim 10, wherein the fuzzy search comprises determining a fuzzy distance metric of a Levenshtein distance where a character change between characters incur a penalty or a magnitude of a Euclidean distance between keys in a grid representation.

12. The server according to claim 10, wherein the tensor search comprises determining a sequence tensor for the node.

13. The server according to claim 10, further performing the steps comprising:
ingesting the hierarchical data to generate the graph structure; and
determining node tensor representation for each node in the graph structure, wherein the node tensor representation for each node is compared to a query string tensor representation during the tensor search.

14. The server according to claim 13, wherein comparing the query string tensor representation to the node tensor representation for each node comprises determining cosine similarities between elements in the query string tensor representation and elements in the node tensor representation for each node.

15. The server according to claim 13, wherein determining node tensor representation for each node in the graph structure comprises:
obtaining node data for a respective node, the node data comprising a phrase;
grouping compound words in the phrase to obtain one or more term groupings;
removing commonly used terms within the one or more term groupings;
removing terms not present in the embeddings dictionary from the one or more term groupings; and
determining the node tensor representation for the respective node as vector representations of the one or more term groupings.

16. A non-transitory computer readable medium storing instructions thereon such that when the instructions are executed by a processor, the processor performs the steps comprising:
receiving a query string from a user device;
searching for the query string via a tensor search of a graph structure to determine node tensor distance score for each node in the graph structure;
searching for the query string via a fuzzy search of the graph structure to determine node fuzzy distance score for each node in the graph structure;
determining nodes with relevant scores by updating a Bayesian network representation with evidence based on the node tensor distance scores and the node fuzzy distance scores of each node; and sending relevant data from the nodes with relevant scores to the user device, wherein the relevant score is based on the node fuzzy distance score being above or equal to a similarity threshold and the relevant score being a weighted average of the node tensor distance score and the node fuzzy distance score based on the node fuzzy distance score being below the similarity threshold.

* * * * *